(12) United States Patent
Kutscher

(10) Patent No.: US 6,293,562 B1
(45) Date of Patent: Sep. 25, 2001

(54) METHOD AND APPARATUS FOR CONTROLLING RIDE HEIGHT OF A WHEELED VEHICLE

(75) Inventor: Eberhard Kutscher, Dettenhausen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/442,743

(22) Filed: Nov. 18, 1999

(30) Foreign Application Priority Data

Nov. 18, 1998 (DE) .............................................. 198 53 126

(51) Int. Cl.$^7$ ....................................................... B60S 9/00
(52) U.S. Cl. .................... 280/6.159; 280/5.5; 280/5.514; 280/6.15
(58) Field of Search ................................. 280/6.159, 5.5, 280/5.514, 6.157, 6.15; 340/442, 443

(56) References Cited

U.S. PATENT DOCUMENTS

| 4,518,169 |   | 5/1985  | Kuroki ............................ 280/6 R |
|-----------|---|---------|---------------------------------------------|
| 4,616,847 |   | 10/1986 | Kanal et al. ..................... 280/707  |
| 4,693,485 | * | 9/1987  | Kamei et al. .................... 280/6.1   |
| 4,787,644 | * | 11/1988 | Yokote et al. ................... 280/840   |
| 4,971,360 | * | 11/1990 | Pischke et al. .................. 280/840   |
| 5,035,137 | * | 7/1991  | Burkard et al. .................. 73/146.5  |
| 5,068,792 | * | 11/1991 | Lehr et al. ...................... 701/37   |
| 5,071,259 | * | 12/1991 | Metzger et al. .................. 374/143   |
| 5,247,831 |   | 9/1993  | Floravanti ....................... 73/178 R |
| 5,267,466 | * | 12/1993 | Morris ............................ 73/1.81  |
| 5,274,355 | * | 12/1993 | Galan ............................. 340/445  |
| 5,430,647 | * | 7/1995  | Raad et al. ...................... 701/38   |
| 5,586,781 | * | 12/1996 | Anderson ......................... 280/708  |
| 5,694,111 | * | 12/1997 | Huang ............................. 340/442  |
| 6,036,201 | * | 3/2000  | Pond et al. ...................... 280/5.514|
| 6,124,787 | * | 9/2000  | Isakov et al. .................... 340/448  |

FOREIGN PATENT DOCUMENTS

| 29 05 931       | 8/1980  | (DE) . |
|-----------------|---------|--------|
| 33 15 594 A1    | 10/1984 | (DE) . |
| 35 12 047 A1    | 10/1985 | (DE) . |
| 41 12 738 A1    | 10/1992 | (DE) . |
| 44 43 810 A1    | 6/1996  | (DE) . |
| 195 32 331      | 3/1997  | (DE) . |
| 195 46 728 A1   | 6/1997  | (DE) . |
| 196 45 897      | 5/1998  | (DE) . |
| 0 779 167       | 6/1997  | (EP) . |
| 2 545 225       | 11/1984 | (FR) . |
| 2 319 107       | 5/1998  | (GB) . |
| 2 344 323       | 6/2000  | (GB) . |
| 7-205629        | 8/1995  | (JP) . |

* cited by examiner

Primary Examiner—Paul N. Dickson
Assistant Examiner—Deanne Draper
(74) Attorney, Agent, or Firm—Crowell & Moring, L.L.P.

(57) ABSTRACT

In a method for controlling the ride height of a wheeled vehicle, the distance between a vehicle body and a wheel suspension unit for at least one wheel provided with a gas-filled tire is adjusted to a distance setpoint value which can be predefined in a variable fashion at least as a function of the vehicle payload. The tire pressure is sensed and the distance setpoint value is additionally predefined in a variable fashion as a function of the sensed tire pressure. For this purpose, in the wheeled vehicle, the tire is assigned a tire-pressure sensor, and the distance setpoint value can additionally be predefined in a variable fashion as a function of the sensed tire pressure.

10 Claims, 2 Drawing Sheets

METHOD AND APPARATUS FOR CONTROLLING RIDE HEIGHT OF A WHEELED VEHICLE

BACKGROUND AND SUMMARY OF THE INVENTION

This application claims the priority of German patent document 198 53 126.5, filed in Germany on Nov. 18, 1998, the disclosure of which is expressly incorporated by reference herein.

The invention relates to a method for controlling the ride height of a wheeled vehicle, and to a wheeled vehicle with a ride-height control system.

German patent document DE 195 46 728 A1 discloses a ride-height control device for a motor vehicle having a body supported on the vehicle axles by a pneumatic support in the form of an air suspension bellows. Wheels with gas-filled tires are provided on the vehicle axles. The height of the vehicle body relative to the vehicle axles can be changed by changing the quantity of air in the air suspension bellows. A plurality of height sensors continuously determine the distances between the vehicle body and the axles, so that this distance can be adjusted to a predefinable setpoint value. In addition, pressure sensors are provided for sensing the pressure in the air suspension bellows, and the sensed pressure value (which is directly dependent on the payload of the motor vehicle) is used to determine an auxiliary variable which is indicative of deformation of the tires. The ride-height control compensates for such deformation of the tires caused by the load, by appropriately taking into account the auxiliary variable in the adjustment of the setpoint value.

German patent document DE 35 12 047 A1 discloses a wheeled vehicle with front and rear wheel suspension units, on which a vehicle body is supported by a vertically adjustable hydraulic or pneumatic supporting device.

A variable pressure can be applied to the two supporting devices via a common controller and a common pressure supply, to adjust the distance between the vehicle and the wheel suspension units. The vertically adjustable supporting device is controlled such that the change in the height of the vehicle takes place as a function of the travel velocity, specifically in such a way that it is set higher at a low travel velocity and lower at a high travel velocity.

German patent document DE 41 12 738 A1 discloses a system for sensing fixed, type-related data of a motor-vehicle tire by means of a sensing unit on a motor-vehicle body. The contactless sensing device scans a data carrier which is permanently connected to the tire, and which contains, for example, information on the material, the geometry and/or other properties of the tire. Preferably it is made available by the tire manufacture.

German patent document DE 33 15 594 A1 discloses a device for monitoring the position of a motor-vehicle body relative to an underlying surface, in which a first distance-measuring device determines the distance between a wheel suspension unit and the underlying surface, and a second distance-measuring device determines the distance between the vehicle body and the underlying surface. The distance-measuring devices are in the form of transceiver units for measuring the propagation time of electromagnetic waves, and are arranged spaced apart from one another on the bodywork of the vehicle, thus permitting the angular position of the bodywork relative to the underlying surface to be determined. Distance-measuring devices, assigned to individual wheels, on the wheel suspension units permit the air pressure of the corresponding wheel tire to be determined. An evaluation circuit determines the position of the bodywork and actuates an actuating element which adjusts the angular position of the vehicle headlight.

German patent document DE 44 43 810 A1 discloses a device for controlling the ride height of a motor-vehicle body relative to an underlying surface, which device measures in a contactless fashion the distance between the vehicle body and underlying surface, using a sensor which is mounted on the vehicle body, by measuring the propagation time of an electromagnetic signal. The signals of the sensor are fed to an electronic evaluation unit which drives actuators which interact with the vehicle suspension system and regulate the ride height of the vehicle.

One object of the invention is to provide a method and apparatus of the type mentioned above, for controlling the ride height on a wheeled vehicle, which uses the simplest possible means to sense and position the vehicle precisely with respect to an underlying surface.

This object is achieved by the method and apparatus according to the invention for controlling the distance between a vehicle body and a wheel suspension unit, in which the distance setpoint value is set as a function of both the vehicle payload (i.e., the wheel load) and the tire pressure. These two variables are used to determine the geometry of the tire in terms of the height of the wheel axle above the underlying surface (i.e., in particular the radius of the tire between the wheel axle and underlying surface) expediently using tire-specific characteristic data. Information concerning the tire geometry is then included as a correction value in the calculation of the distance setpoint value.

In one embodiment of the invention, a wheeled vehicle has a tire-pressure sensor (i.e., a gas pressure sensor), whose signal is supplied together with a signal of a sensor for sensing the vehicle payload (in particular the wheel load), to a regulator unit which determines the axle height between the wheel suspension unit and the road, in order to correct the distance setpoint value between the vehicle body and wheel suspension unit.

In another embodiment of the invention, the distance setpoint value is determined as the difference between a preset constant distance between the vehicle body and an underlying surface, and an axle-height correction value. The axle-height correction value, which is determined with reference to predefined characteristic curves as a function of the vehicle payload and the tire pressure, describes the geometry of the tire at a given time by representing the distance between the wheel axle and the underlying surface. It is not influenced by the method for controlling ride height; instead, when the axle-height correction value changes, the distance which is to be set between the vehicle body and the wheel suspension unit is changed (in order to maintain the distance between the vehicle body and the underlying surface constant even when the tire geometry and thus the axle-height correction value changes). Here, the predefined characteristic curves describe the axle height (also referred to as the so-called static tire radius) as a function of the wheel load and the tire pressure.

According to a further feature of the invention, the axle-height correction value is determined as the sum of at least a tire-pressure-specific correction component and a payload-specific correction component, the latter being determined from the measured load of a spring element which supports the vehicle body against the wheel suspension unit. The tire-pressure-specific correction component and the payload-specific correction component can each be calculated separately from one another and easily added in order to obtain the axle-height correction value. In this regard, the load of a spring element which is in the form of a hydraulic suspension unit or pneumatic suspension unit can be sensed particularly easily as a pressure within the spring element or within the assigned hydraulic or pneumatic system.

In a further embodiment of the invention, the distance setpoint value also varies as a function of a sensed travel velocity or wheel rotational speed. As a result, the tire geometry which changes with the travel velocity of the vehicle (or the rotational speed of the wheel) is taken into account by means of an appropriate correction of the distance setpoint value. Preferably, the corresponding dynamic tire radius is determined for a specific velocity with reference to a predefined, tire-dependent characteristic curve and is taken into account, as velocity-dependent correction component, in the determination of the axle-height correction value.

In a further refinement of the invention, a wheeled vehicle is provided with a vehicle body supported by a plurality of hydraulic or pneumatic spring elements, on respective wheel suspension units, each having a wheel with a gas-filled tire mounted thereon. The ride-height control system has a central hydraulic or pneumatic pressure supply for the spring elements with a pressure sensor, a compressor unit and a valve block which can be actuated by a central regulator unit. It is thus possible to couple the spring elements individually to the compressor unit and the pressure sensor by means of the valve block. In such an arrangement, only a central pressure sensor and a central compressor unit are necessary to supply pressure and monitor the pressure for a plurality of spring elements. The spring elements can successively be coupled to the compressor unit and the pressure sensor by means of the valve block, so that a particularly simple design of the ride-height control system is obtained.

Other objects, advantages and novel features of the present invention will become apparent from the following detailed description of the invention when considered in conjunction with the accompanying drawings.

DETAILED DESCRIPTION OF THE DRAWINGS

Figure 2:
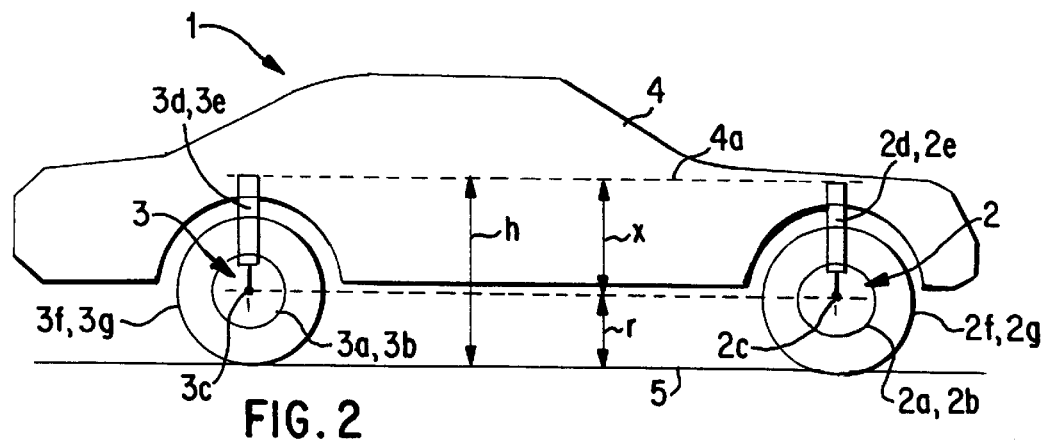
FIG. 2 is a schematic side view of a wheeled vehicle equipped with the ride-height control system according to FIG. 1, in the unladen state.
Figure 3:
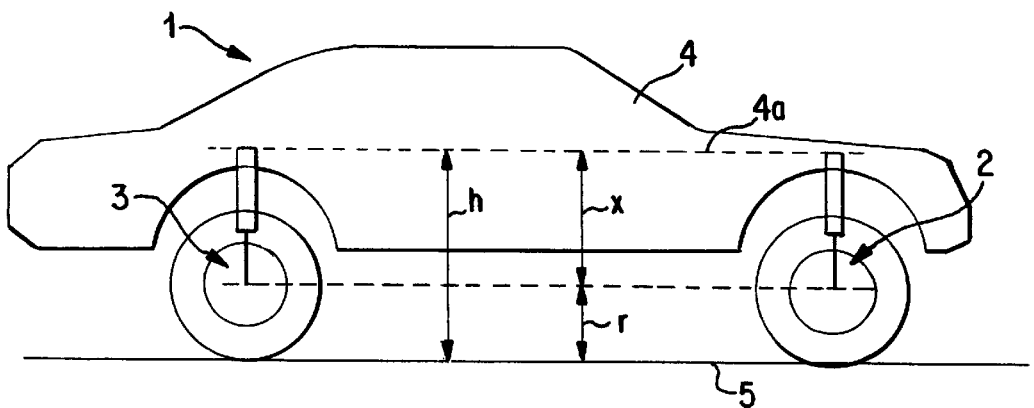
FIG. 3 shows the wheeled vehicle according to FIG. 2 in a laden state.

FIGS. 2 and 3 show a wheeled vehicle in the form of a passenger car 1 with a body 4 supported on a front-wheel suspension unit 2 by means of spring elements 2d, 2e, and on a rear-wheel suspension unit 3 by means of spring elements 3d, 3e. The passenger car 1 stands on an underlying surface 5 with four wheels 2a, 2b, 3a, 3b. All four wheels 2a, 2b, 3a, 3b are provided with air-filled tires 2f, 2g, 3f, 3g, and are mounted rotatably about the horizontal axles 2c and 3c. The distance between the axles 2c, 3c and the underlying surface 5 is referred to below as the (same) axle height r for the two axles in the unloaded state, and is essentially dependent on the properties and load state of the respective tires 2f, 2g, 3f, 3g (in particular the vehicle payload). For the sake of simplification, it is assumed that all four tires 2f, 2g, 3f, 3g of the passenger car 1 are identical and are loaded to the same degree. It is also possible to use completely different tires without any restriction.

A reference plane 4a, which is parallel to the underlying surface 5, is defined by the upper attachment points of the spring elements 2d, 2e and 3d, 3e to the vehicle body 4, at a distance x from the wheel suspension units 2 and 3 or the axles 2c and 3c (assuming an axle height r which is identical for all four wheels). Since the reference plane 4a can be predefined at any desired height on the vehicle body, the distance x is completely independent of the arrangement of the spring elements 2d, 2e and 3d, 3e. However, for the sake of simplification, all the spring elements 2d, 2e, 3d, 3e are of identical design and their lengths corresponds to the distance x.

As is clear from FIGS. 2 and 3, the total of the axle height r and distance x yields the ground clearance h of the reference plane 4a. The ground clearance h should be constant, independent of the axle height r and the distance x, so that the vehicle body 4 is not inclined with respect to the underlying surface 5.

Starting from the unloaded state according to FIG. 2, in the passenger car 1 a payload causes the loading on the spring element 2d, 2e and 3d, 3e or the wheel loads to change. Without a ride-height control, the distance x changes in accordance with the length of the spring elements according to a deformation of the spring elements, as does the axle height r owing to a deformation of the tires 2f, 2g and 3f, 3g. Consequently, the ground clearance h of the reference surface 4a also changes, which means that the vehicle body 4 drops towards the underlying surface 5. In addition, without a ride-height control it is possible that when the wheel loads are different the spring elements 2d, 2e, 3d, 3e will be deformed differently, in precisely the same way as the tires 2f, 2g and 3f, 3g, so that the vehicle body 4 assumes an inclined attitude with respect to the underlying surface 5.

Figure 1:
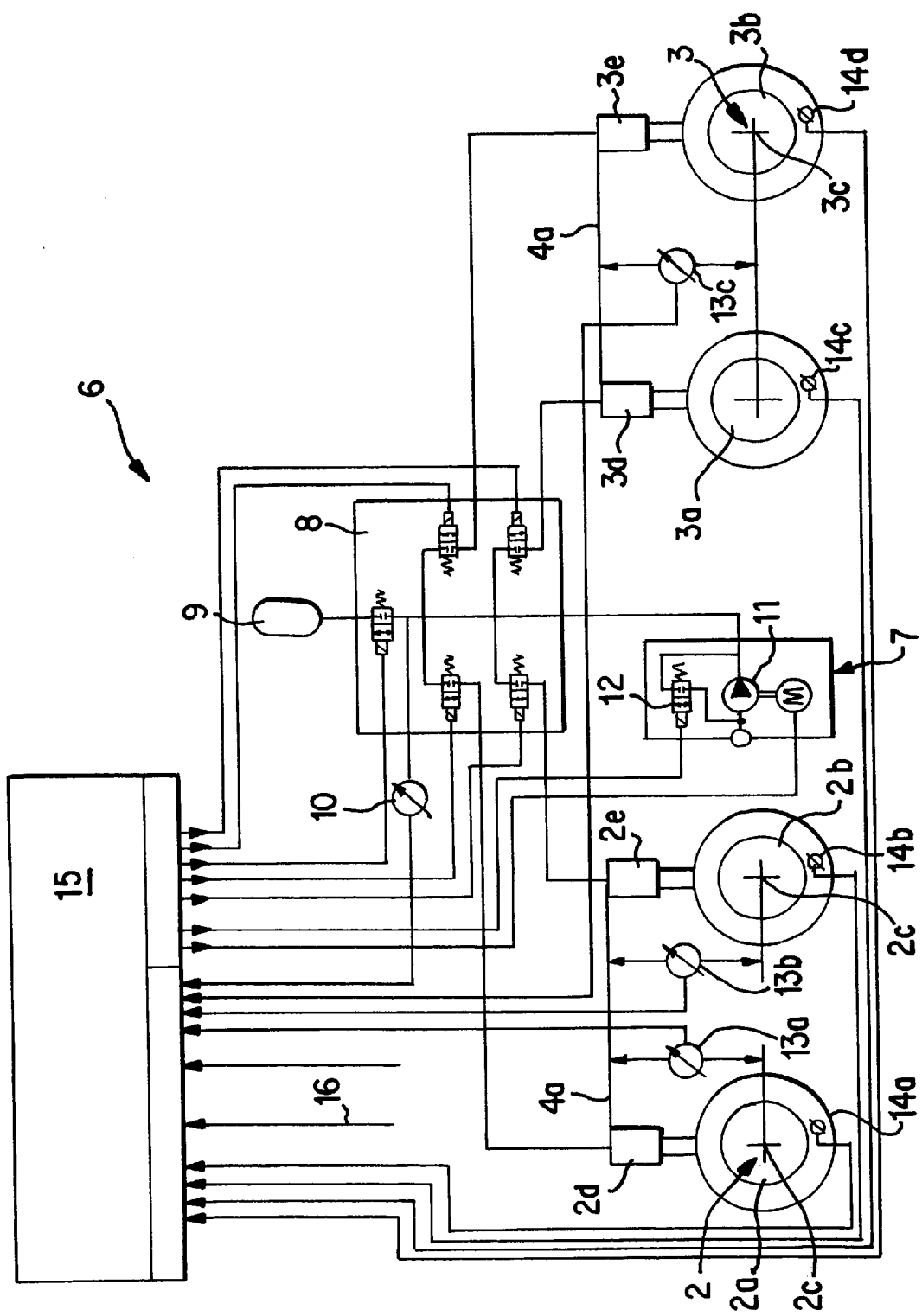
FIG. 1 shows a schematic view of a pneumatic ride-height control system for a wheeled vehicle with the four gas-filled tires arranged on two axles.

The ride-height control system 6 illustrated in FIG. 1 is used to counteract this effect. The spring elements 2d, 2e, 3d, 3e are embodied as pneumatic telescopic legs which can have gas pressure applied to them, alternately or together, by a common compressor unit 7, via a valve block 8. A central gas pressure accumulator 9 is provided to stabilize the pressure in the system. A central pressure sensor 10 is used to monitor the gas pressure in the valve block 8 independently of the switched position of the valve block. The compressor unit 7 comprises a motor-driven gas compressor 11, in parallel with which a venting valve 12 is connected.

Assigned to the two front wheels 2a and 2b of the passenger car 1 are ride-height sensors 13a and 13b which each sense the distance x between the wheel axles 2c and the reference plane 4a or a corresponding length between the vehicle body and the front wheel suspension unit 2, which depends on the deformation of the spring elements 2d, 2e. Assigned to the two spring elements 3d, 3e between the rear-wheel suspension unit 3 and the vehicle body 4 is a ride-height sensor 13c for measuring the distance x between the rear axle 3c, which is of rigid design, and the reference plane 4a. In one modified exemplary embodiment, it is possible to provide two ride-height sensors which sense any other desired lengths between the rear-wheel suspension unit 3 and the vehicle body 4 which are representative of the deformation of the spring elements 3d, 3e.

Assigned to the tires 2f, 2g, 3f, 3g are pressure sensors 14a to 14d for sensing the gas pressure in the respective tires. The pressure sensors 14a to 14d are preferably arranged in the rims of the respective wheels 2a, 2b, 3a, 3b and transfer, preferably by radio, the sensed tire pressure values to a central regulator unit 15, to which all the measured values of the ride-height control system 6 are also fed. In the present exemplary embodiment, there is also provision of a velocity sensor (not shown) for sensing the vehicle velocity, the velocity signal 16 of which sensor is also fed to the regulator unit 15.

In one modified exemplary embodiment, instead of the ride-height sensors 13a to 13c which sense the deformation of the spring elements 2d, 2e, 3d, 3e (which can be of any desired design in this regard), pressure sensors are provided which sense the hydraulic or pneumatic pressure within the spring elements which are embodied as hydraulic or pneumatic springs.

Figure 4:
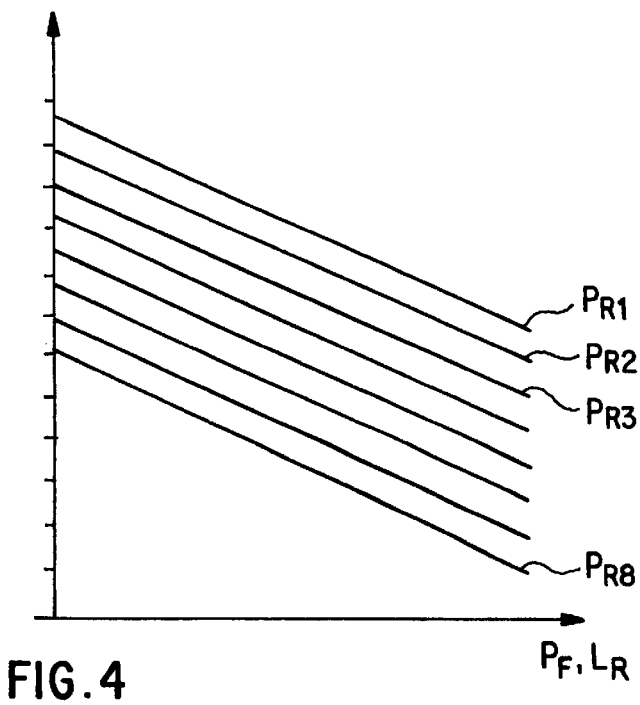
FIG. 4 is a two-dimensional view of an axle-height correction value as a function of the load of a spring element, or the wheel load for various tire pressure values.

The regulator unit 15 has characteristic curves stored therein, for determining the wheel load (which is dependent on the payload of the passenger car) based on the deformation of the spring elements 2d, 2e, 3d, 3e, which is determined in particular by measuring pressure or length. The characteristic curves describe the behavior of the spring element in terms of a functional relationship between the length of the spring element or the pressure in the spring element and the outer loading of the spring element. In addition, in the regulator unit 15 there are characteristic curves stored which describe the relationship between the variable wheel load $L_R$ and the wheel pressure $p_R$ and thus the geometry of the tire. These characteristic curves represent a mathematical function of two variables which describes the properties and the behavior of the respective tire. In the present representative embodiment, the axle height r constitutes the relevant geometric variable of the tire. It corresponds to the tire radius in the unloaded state minus the deformation of the tire due to loading. FIG. 4 illustrates a family of characteristic curves for different tire pressures $p_{R1}$ to $p_{R8}$ in the form of single straight lines which represent the relationship between the axle height r and the wheel load $L_R$ in a merely qualitative fashion. Since there is a fixed relationship between the wheel load $L_R$ and the loading of a corresponding spring element which is illustrated as pressure $p_F$ both the wheel load $L_R$ and the pressure $p_F$ of the spring element can be plotted on the abscissa as a variable.

For a tire with the dimensions 225/60 R16 it is possible, for example, to specify numerical values in the range between approximately 300 mm and 315 mm for the axle height r on the ordinate and values of between approximately 400 kg and 630 kg for the wheel load $L_R$ on the abscissa. The wheel loads correspond to pressures $p_F$ between approximately 5 bar and 11 bar in a customary pneumatic spring element. The numerical values for the tire pressure $p_R$ of the various characteristic curves are at intervals of 0.2 bar between $p_{R1}$ =3 bar and $P_{R8}$ =1.6 bar.

The method according to the invention for ride-height control is carried out separately for each front wheel in the passenger car 1 and together for the rear wheels in the following way.

Firstly, the distance x is determined, so that it can be compared continuously with a distance setpoint value $x_{setp}$, between the reference plane 4a and the respective wheel suspension unit. For this purpose, either a distance measurement is carried out by means of one of the ride-height sensors 13a to 13c, or in another exemplary embodiment pressure sensors in the spring elements 2d, 2e, 3d, 3e are used to carry out a pressure measurement and the pressure is converted into an instantaneous length of the spring element using a spring-element-specific characteristic curve. As a result, it is possible to determine the distance x on the one hand and the load state of the corresponding spring element on the other. In addition, the value of the wheel load follows directly from the load state of the spring element. The tire pressure is measured in a further method step.

Furthermore, the axle height r is determined from the wheel load $L_R$ and the tire pressure $p_R$. For this purpose, a characteristic diagram or a proximity function for the axle height r as a function of the wheel load $L_R$ and the tire pressure $p_R$ is stored in the regulator unit 15. The linear function $$r(L_R, p_R) = axL_R + bxp_R + c$$

can be used as a particularly simple approximation, a and b constituting, for example, gradient factors (determined by measurements) for the wheel load or tire pressure, and c constituting a constant offset value. When hydraulic or pneumatic springs are used as spring elements, the axle height r can also be specified directly as a function of the pressure $p_F$ in the respective spring element:

$$r(p_F, p_R) = dxp_F + bxp_{R+e}$$

d representing a pressure-specific gradient factor and e representing a constant offset.

In a further method step, the axle height r is deducted, as a so-called axle-height correction value, from a determined ground clearance h, which is to be kept constant. According to the following formula, this yields the setpoint value $x_{setp}$ for the distance x:

$$x_{setp} = h - r$$

The distance setpoint value $x_{setp}$ is thus changed by a payload-specific correction component and a tire-pressure-specific correction component, so that the distance x is controlled in a way which takes into account the tire geometry represented by the axle-height correction value. The method consequently does not adjust the distance x to a fixed setpoint but rather to a setpoint value $x_{setp}$ which is predefined in a variable way. The setpoint value is corrected in a tire-specific fashion as a function of the payload of the vehicle and the tire pressure.

In a modified exemplary embodiment, the distance setpoint value $x_{setp}$ is corrected by a velocity correction value. For this purpose, in a separate method step, either the vehicle velocity or the rotational speed of the wheel is measured, and the dynamic deformation of the tire is determined with reference to a tire-specific characteristic curve. In particular, a rotational-speed-specific change in the tire radius is determined, it being possible to take into account the tire pressure and the wheel load as further influencing parameters. The use of such a velocity correction value when the velocity of the vehicle is increasing has generally resulted in a decreasing distance setpoint value $x_{setp}$ because the so-called dynamic tire radius increases as the rotational speed of the tire increases.

Using the method according to the invention it is thus possible to keep the ground clearance h of the vehicle body 4 constant independently of the payload of the vehicle, the tire pressure and, if appropriate, the travel velocity.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling ride height in a wheeled vehicle, in which a distance between a vehicle body and a wheel suspension unit for at least one wheel having a gas-filled tire is adjusted to a distance setpoint value which is variable at least as a function of the vehicle payload, said method comprising:

sensing tire pressure of the at least one wheel; and adjusting the distance setpoint value as a function of the sensed tire pressure.

2. The method according to claim 1, wherein the distance setpoint value is determined as a difference between a predetermined constant distance between the vehicle body and an underlying vehicle supporting surface, and an axle height correction value determined as a function of vehicle payload and tire pressure, using a predefined characteristic curve.

3. The method according to claim 2, wherein the axle height correction value is determined as a sum of at least one tire-pressure-specific correction component and a payload-specific correction component, said payload-specific correction component being determined from the measured load of a spring element which supports the vehicle body against a wheel suspension unit.

4. The method according to claim 1, wherein the distance setpoint value varies also as a function of a sensed travel velocity or wheel rotational speed.

5. A wheeled vehicle having a vehicle body supported by a spring element on a wheel suspension unit on which a wheel with a gas-filled tire is mounted, and a ride-height control system, which adjusts a distance between the vehicle body and the wheel suspension unit to a distance setpoint value which can be varied as a function of vehicle payload, wherein:

a tire-pressure sensor is assigned to the tire; and the distance setpoint value can also be varied as a function of the sensed tire pressure.

6. The wheeled vehicle according to claim 5, wherein the ride-height control system determines the distance setpoint value as a difference between a predetermined constant distance, between the vehicle body and an underlying vehicle supporting surface, and an axle height correction value determined as a function of the vehicle payload and the tire pressure, using predefinable characteristic curves.

7. The wheeled vehicle according to claim 6, wherein the axle height correction value is a sum at least of a tire-pressure-specific correction component and a payload-specific correction component, the latter being derived from a load of a vehicle supporting spring element.

8. The wheeled vehicle according to claim 5, further comprising a velocity sensor assigned to the wheeled vehicle, wherein the distance setpoint value can additionally be varied as a function of sensed velocity.

9. The wheeled vehicle according to claim 5, wherein:

the vehicle body is supported, by a plurality of hydraulic or pneumatic spring elements on respective wheel suspension units, each of which has mounted thereon a wheel which is provided with a gas-filled tire;

the ride-height control system has a central, hydraulic or pneumatic pressure supply system for the spring elements with a pressure sensor a compressor unit and a valve block which can be actuated by a central regulator unit; and the spring elements can be coupled individually to the compressor unit and the pressure sensor via the valve block.

10. A ride height control system for a vehicle having a vehicle body supported by a spring element on a wheel suspension unit with a wheel and a gas filled tire mounted thereon, said ride height control system comprising:

a pneumatically or hydraulically actuated device which adjusts a distance between the vehicle body and the wheel suspension unit to a distance setpoint value which can be varied as a function of vehicle payload; and a tire pressure sensor assigned to the tire;

wherein the distance setpoint value also varies as a function of sensed tire pressure.

* * * * *